US010113882B2

(12) United States Patent
Solet et al.

(10) Patent No.: US 10,113,882 B2
(45) Date of Patent: Oct. 30, 2018

(54) INDICATING DEVICE, IN PARTICULAR A PRESSURE GAUGE

(71) Applicant: ASCO SAS, Lucé (FR)

(72) Inventors: Daniel Solet, Saint Sauveur Marville (FR); Gonzague Longpre, Lucé (FR)

(73) Assignee: ASCO AS, Luce (FR)

( * ) Notice: Subject to any disclaimer, the term of this patent is extended or adjusted under 35 U.S.C. 154(b) by 101 days.

(21) Appl. No.: 15/502,263

(22) PCT Filed: Aug. 7, 2014

(86) PCT No.: PCT/IB2014/063776
§ 371 (c)(1),
(2) Date: Feb. 7, 2017

(87) PCT Pub. No.: WO2016/020725
PCT Pub. Date: Feb. 11, 2016

(65) Prior Publication Data
US 2017/0219377 A1   Aug. 3, 2017

(51) Int. Cl.
*G01B 3/22* (2006.01)
*G01L 19/16* (2006.01)
*G01L 19/14* (2006.01)
*G01D 1/12* (2006.01)
*G01D 7/00* (2006.01)

(52) U.S. Cl.
CPC .............. *G01D 1/12* (2013.01); *G01D 7/00* (2013.01); *G01B 3/22* (2013.01); *G01L 19/14* (2013.01); *G01L 19/16* (2013.01)

(58) Field of Classification Search
CPC ............ G01B 3/22; G01L 19/14; G01L 19/16
See application file for complete search history.

(56) References Cited

U.S. PATENT DOCUMENTS

| 1,451,240 | A | * | 4/1923 | Tulley | ..................... G01F 23/34 |
| | | | | | 116/228 |
| 1,617,485 | A | * | 2/1927 | Hughes | ..................... G01B 3/22 |
| | | | | | 33/556 |
| 1,634,156 | A | * | 6/1927 | McCommon | ............ G01B 3/26 |
| | | | | | 33/549 |

(Continued)

FOREIGN PATENT DOCUMENTS

| DE | 195 30 023 A1 | 2/1996 |
| DE | 200 21 111 U1 | 3/2001 |

(Continued)

OTHER PUBLICATIONS

Apr. 10, 2015 International Search Report issued in International Patent Application No. PCT/IB2014/063776.

*Primary Examiner* — David A Rogers
(74) *Attorney, Agent, or Firm* — Oliff PLC

(57) ABSTRACT

An indicating device, in particular a pressure gauge, including: a basic housing including a mechanism for driving a rotating needle indicator, movable relative to a dial, an interface housing attached to the basic housing, at least one rotary screen carried by the interface housing, for locating an operating area, of which the angular position can be adjusted about the axis of the needle, a protective cover removable attached to the interface housing and making it possible, when removed, to adjust the position of the rotary screen without separating the interface housing from the basic housing.

11 Claims, 2 Drawing Sheets

(56) References Cited

U.S. PATENT DOCUMENTS

Figure 1:
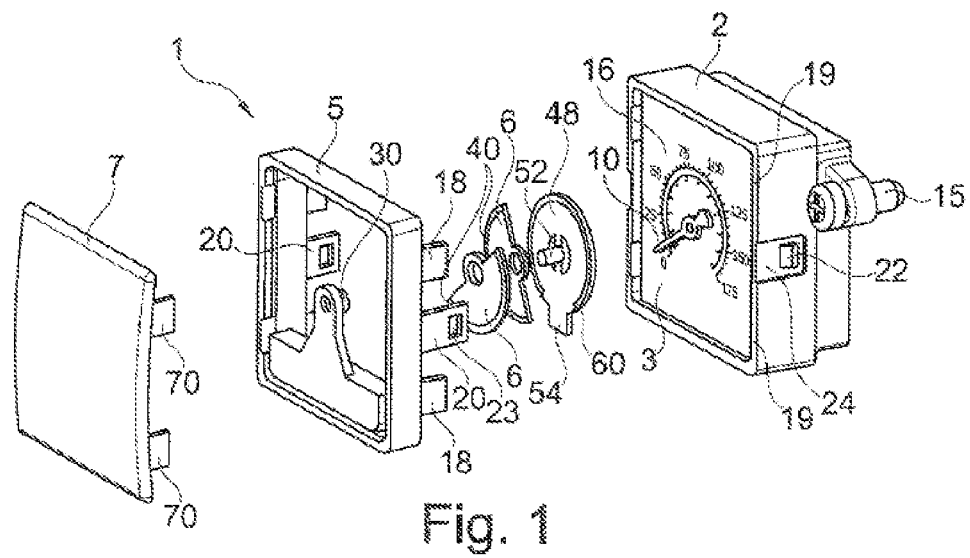

| | | | |
|---|---|---|---|
| 1,723,390 A | 8/1929 | Tingley | |
| 1,937,936 A * | 12/1933 | Aldeborgh | G01B 3/22 33/556 |
| 2,000,476 A * | 5/1935 | Schmidt | B23Q 17/2225 33/637 |
| 2,011,517 A * | 8/1935 | Geoffrion | G04B 19/00 116/302 |
| 2,115,530 A * | 4/1938 | Knopf | G09F 7/00 116/292 |
| 2,501,033 A | 3/1950 | Denison | |
| 2,550,033 A | 4/1951 | Adams | |
| 2,634,605 A * | 4/1953 | Shea | G01N 7/00 374/55 |
| 3,176,402 A * | 4/1965 | Cocks | G01B 5/06 33/785 |
| 4,055,141 A * | 10/1977 | Homs | G01D 13/12 116/292 |
| 4,204,334 A * | 5/1980 | Dela Cruz | G01C 9/12 33/369 |
| 4,773,270 A | 9/1988 | Ogasawara et al. | |
| 5,088,440 A * | 2/1992 | Keaney | G01D 13/06 116/284 |
| 5,646,913 A * | 7/1997 | Quesenberry | G04B 19/10 368/223 |
| 6,683,821 B1 * | 1/2004 | Emtyazi | G04B 19/046 368/233 |
| D500,958 S * | 1/2005 | Cooper | D10/126 |
| 7,126,881 B2 * | 10/2006 | Cooper | G04B 19/10 368/223 |
| D686,093 S * | 7/2013 | Wright | D10/40 |
| 2003/0080873 A1* | 5/2003 | Salinas | G08B 5/24 340/815.4 |
| 2004/0200088 A1* | 10/2004 | Ishii | G01B 3/22 33/832 |
| 2006/0104160 A1* | 5/2006 | Lassalle | G04B 19/00 368/77 |
| 2008/0041299 A1* | 2/2008 | Hoffman | G01D 11/24 116/305 |

FOREIGN PATENT DOCUMENTS

| | | |
|---|---|---|
| EP | 1 215 478 A2 | 6/2002 |
| FR | 3 008 790 A1 | 1/2015 |

* cited by examiner

INDICATING DEVICE, IN PARTICULAR A PRESSURE GAUGE

The present invention relates to an indicating device, particularly a pressure gauge, comprising a basic housing comprising a drive mechanism that drives a rotary indicator needle that is mobile relative to a dial.

It has been proposed for such indicating devices to be provided with a means of indicating operating zones.

Application DE19530023 A1 discloses an indicating device in which the basic housing bears two mobile pointers which may be moved relative to the dial to indicate boundaries of operating zones.

Application EP 1 215 478 A2 discloses an indicating device comprising a cover that fixes onto the basic housing, this cover being produced with a retaining pin to which two rotary screens may be fixed. One disadvantage of this indicating device is that the screens are adjusted without sight of the graduations on the dial because in order to change the positions of the screens it is necessary to separate the cover and the basic housing.

Patent U.S. Pat. No. 4,773,270 discloses an indicating device comprising adjustable arcs that may identify operating zones.

Patent U.S. Pat. No. 2,501,033 discloses an indicating device comprising sectors that may be maneuvered using handles to delimit operating zones.

There is a need to improve indicating devices still further so as in particular to enjoy a device that makes it possible to indicate at least one operating zone with the possibility of easily adjusting this and which is of reliable and inexpensive construction.

The invention meets this objective by virtue of an indicating device, particularly a pressure gauge, comprising:
- a basic housing comprising a drive mechanism that drives a rotary indicator needle that is mobile relative to a dial,
- an interface housing attached to the basic housing,
- at least one rotary screen borne by the interface housing, for identifying an operating zone, of which the angular position about the axis of the needle is adjustable,
- a protective cover fixed removably to the interface housing and, when removed, allowing the position of the rotary screen to be adjusted without detaching the interface housing from the basic housing.

By virtue of the invention it is easy for the user to accurately alter the position of the rotary screen or screens by removing the protective cover and moving the screen or screens manually relative to the dial. Adjustment of the screen or screens may be done with sight both of the screen and of the dial, notably without the risk of damaging the needle or the drive mechanism. Once the adjustment has been made, the protective cover may be refitted on the interface housing. Access to the settings of the screen or screens is then no longer possible from the outside.

The fitting of the interface housing may be performed, if appropriate, while the basic housing is already in place in the environment in which it is used.

For preference, the indicating device comprises at least two superposed rotary screens, of which the angular positions may be adjusted independently of one another.

The interface housing may comprise a retaining pin on which the rotary screen or screens are mounted.

The interface housing may comprise a support having a base, notably a widened base, allowing the rotary screen or screens to be partially concealed. That makes it possible to create an indicating device that is visually attractive and highly legible. The support may bear the aforementioned retaining pin, this for example being produced as a single piece by molding with the support.

For preference, the indicating device comprises a fixed screen, borne by the interface housing, behind the rotary screen or screens, the rotary screen or screens preferably being held on the interface housing by the fixed screen, making it possible to have a compact assembly. The fixed screen and the interface housing may then comprise interacting reliefs imposing a predefined orientation on the fixed screen on the interface housing, upon fitting. The aforementioned retaining pin may then be hollow and the fixed screen may comprise a peg engaged in this hollow pin, notably clip-fastened therein.

For preference, the rotary screen or screens each bear a colored region extending over an angular sector of less than one complete revolution about the axis of rotation of the needle. This region may be intended to indicate an abnormal operating region and be colored red for example. The fixed screen, if any, may comprise a colored region extending over an angular sector about the axis of rotation of the needle, notably of less than one complete revolution, this colored region preferably being partially concealed by the colored region or regions of the rotary screen or screens, these preferably being of a different color. The region on the fixed screen is, for example, green when intended to indicate a normal operating region.

It is possible to benefit from the invention on indicating devices that initially comprise only the basic housing and a cover, without needing to replace the entire unit, and therefore without removing the basic housing, thereby avoiding the need to interrupt the pressure in the compressed air network when the indicating device is a pressure gauge installed on such a network. In this case, the interface housing may be fixed on the basic housing in place of the cover.

The interface housing and the cover may have fixing tabs positioned substantially in the same way on opposite sides of the interface housing and of the cover.

Figure 2:
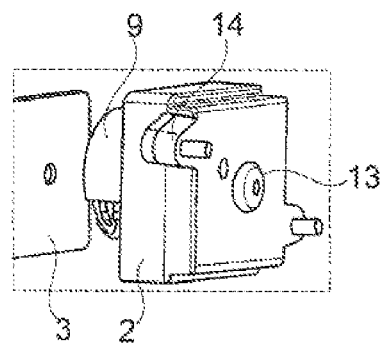
Figure 3:
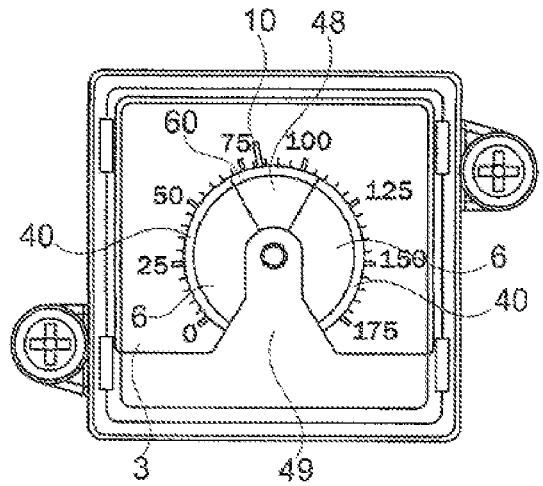
Figure 4:
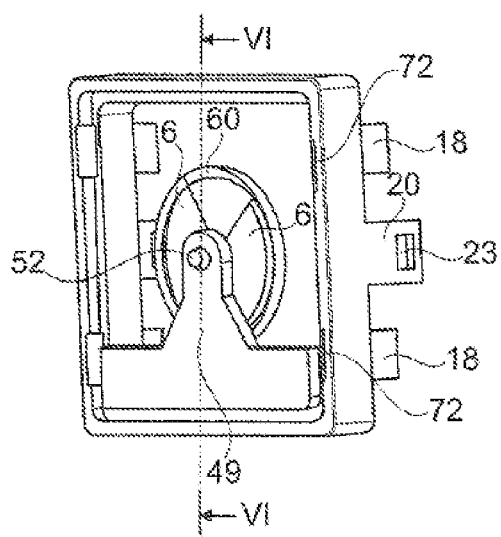
Figure 5:
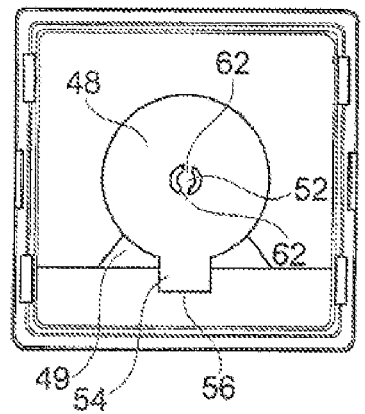
Figure 6:
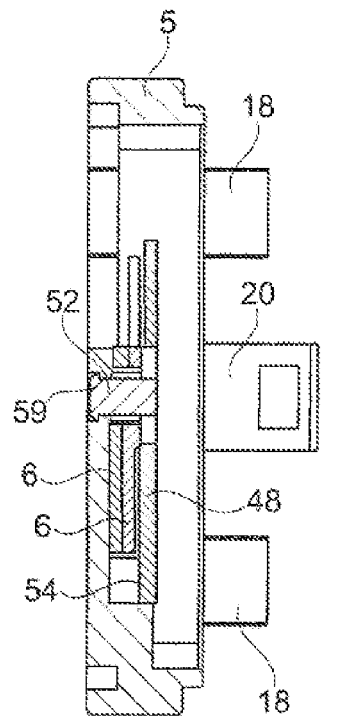
Figure 7:
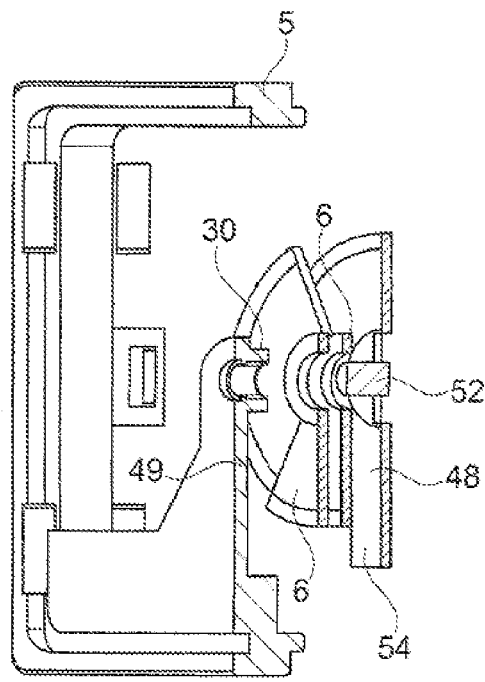
Figure 8:
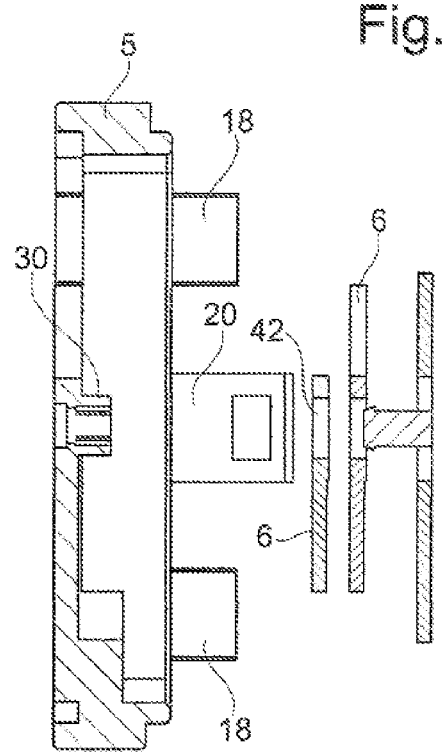

The invention may be better understood from reading the following detailed description of one nonlimiting embodiment thereof and from studying the attached drawing in which:

FIG. 1 is a exploded perspective view of an indicating device produced according to the invention, FIG. 2 depicts the device of FIG. 1 from another viewpoint, FIG. 3 is a front-on view of the device in the assembled state, FIG. 4 depicts the interface housing and the rotary screens in isolation, FIG. 5 is a rear view of the interface housing and of the screens of FIG. 4, FIG. 6 is a view in axial section in a median plane, on VI-VI of FIG. 4, FIG. 7 is an exploded view with axial half-section of the interface housing and of the screens of FIG. 6, and FIG. 8 is a view similar to FIG. 6, prior to the assembling of the screens on the interface housing.

The indicating device 1 depicted in the figures is a pressure gauge comprising a basic housing 2, an interface housing 5 and a protective cover 7.

The basic housing 2 houses a drive mechanism 9 that drives an indicator needle 10 that is mobile in rotation with respect to a dial 3 borne by the basic housing 2. The latter may, on its rear surface, as illustrated in FIG. 2, have a connection 13 allowing fluidtight communication with the fluid the pressure of which is to be measured, and comprise fixing lugs 14 allowing the passage of screws 15 for mounting the basic housing 2 on a supporting structure, not depicted. The mechanism 9 is, for example, of the Bourdon type known per se.

The dial 3 is preferably graduated and may, as illustrated, have graduation 16 indicating the value of the pressure.

The interface housing 5 is configured to be fixed to the basic housing 2 and to this end may comprise guide tabs 18 designed to engage in corresponding recesses 19 of the basic housing 2.

The interface housing 5 also comprises fixing tabs 20, for example two of these on opposite lateral sides of the interface housing 5, designed to clip onto reliefs of the basic housing 2. Each fixing tab 20 may, as illustrated, have a cutout 23 designed to clip over a tooth 22 provided on the basic housing, it being possible for this tooth to project from the bottom of a recess 24 into which the tab 20 engages.

In the example illustrated, the interface housing 5 thus comprises two fixing tabs 20 on its two lateral sides and four guide tabs 18, the fixing tabs 20 each being situated between two guide tabs 18 on one and the same side of the interface housing.

The interface housing 5 comprises a retaining pin 30 on which, as may be seen more particularly in FIGS. 6 to 8, two, front and rear, rotary screens 6 are mounted. Each screen 6 in the example illustrated has a semicircular shape with a colored indicating region 40 which thus extends over 180°. Each rotary screen 6 comprises a central hole 42 the diameter of which is chosen so as to be a close fit on the retaining pin 30 such that once the operator has positioned these angularly in the desired angular position, the rotary screen 6 no longer move, but may be reset to a different angular orientation.

According to the invention, the indicating device 1 also, in the example illustrated, comprises a fixed screen 48 which is placed behind the rotary screens 6 so as to hold them against a support 49 of the retaining pin 30.

The fixed screen 48 bears a peg 52 which is fixed by clip-fastening in the retaining pin 30, as may be seen in FIG. 6. The peg 52 may comprise one or more clip-fastening teeth 59 for this purpose. The peg 52 may be connected to the fixed screen 48 by diametrically opposed tabs 62, giving it a certain degree of flexibility. The fixed screen 48 may comprise an extension 54 at its base which is engaged in a notch 56 of the support 49, ensuring the angular positioning of the screen 48 with a predefined orientation.

The fixed screen 48 advantageously, as may be seen notably in FIG. 1, comprises a colored region 60 which extends over less than one full revolution, being interrupted near the extension 54. The colored region 60 is, for example, green, and that 40 of each rotary screen 6 red.

When in place on the interface housing, the rotary screens 6 partially conceal the colored range 60 to a greater or lesser extent depending on the annular orientation they are given, as may be seen in FIG. 3.

The needle 10 has a length greater than the radius of the screens 6 and 48, so as to be visible behind the screens 6 and 48 beyond the colored regions.

The support 49, as may be seen in FIG. 3, conceals the lower part of the screens 6 and 48 so that the user sees only the edge of each rotary screen 6 adjacent to the colored region 60, thereby avoiding detracting from the visual attractiveness of the indicating device and the legibility thereof.

The cover 7 comprises fixing tabs 70 which engage in corresponding recesses 72 of the interface housing. It is possible to upgrade the indicating device 1 by offering it initially without the interface housing 5, with an existing cover fixed to the basic housing 2 and then with the interface housing 5 and the associated cover 7. The existing cover, which is replaced by the interface housing, comprises guide tabs similar to the tabs 70 and fixing tabs similar to the tabs 20.

Of course, the invention is not restricted to the example which has just been described.

In particular, the invention is not limited to an indicating device the basic housing of which is square in shape when viewed face-on, as illustrated in FIG. 3. The shape of the basic housing may thus be a polygon other than a square, or a non-polygon, for example circular. The extension 54 may be omitted and the colored region 60 may extend continuously over 360°.

In an alternative, the peg 52 is splined in order to increase still further the friction against the rotary screens.

The number of rotary screens may vary and for example may be limited to one. The fixing of the interface housing to the basic housing may be done in some way other than by clip-fastening, and for example using screws.

It is possible for the cover 7 to be detachable or non-detachable from the interface housing 5. In the example illustrated, the cover 7 is detachable but in an alternative form, the cover 7 is articulated to the interface housing 5, being raised in order to access the rotary screens.

The mounting of the rotary screens may be done in yet another different way, these for example being molded with a central barrel engaged in a hole in the support.

The mechanism for driving the needle contained in the basic housing may be some mechanism other than a pressure gauge mechanism.

The expression "comprising a" is to be understood as being synonymous with "comprising at least one".

The invention claimed is:

1. An indicating device comprising:
    a basic housing comprising a drive mechanism that drives a rotary indicator needle that is mobile relative to a dial,
    an interface housing attached to the basic housing,
    at least one rotary screen borne by the interface housing, for identifying an operating zone, of which the angular position about the axis of the needle is adjustable,
    a protective cover fixed removably to the interface housing and, when removed, allowing the position of the rotary screen to be adjusted without detaching the interface housing from the basic housing.

2. The device as claimed in claim 1, comprising at least two superposed rotary screens, of which the angular positions may be adjusted independently of one another.

3. The device as claimed in claim 1, the interface housing comprising a retaining pin on which the rotary screen or screens are mounted.

4. The device as claimed in claim 3, the interface housing comprising a support bearing said retaining pin of the rotary screen or screens, this support having a widened base allowing the rotary screen or screens to be partially concealed.

5. The device as claimed in claim 3, the pin being hollow and the fixed screen comprising a peg engaged in this hollow pin.

6. The device as claimed in claim 1, comprising a fixed screen, borne by the interface housing, behind the rotary screen or screens, the rotary screen or screens being held on the interface housing by the fixed screen.

7. The device as claimed in claim 6, the fixed screen and the interface housing comprising interacting reliefs imposing a predefined orientation on the fixed screen on the interface housing.

8. The device as claimed in claim 6, the fixed screen comprising a colored region extending over an angular sector about the axis of rotation of the needle, of 360° or less.

9. The device as claimed in claim 1, the rotary screen or screens each bearing a colored region extending over an angular sector of less than one complete revolution about the axis of rotation of the needle.

10. The device as claimed in claim 1, the interface housing and the cover comprising fixing tabs positioned substantially in the same way on opposite sides of the interface housing and of the cover.

11. The device according to claim 1, the needle having a length greater than the radius of the rotary screens and of the fixed screen.

* * * * *